United States Patent
Shih

(10) Patent No.: US 9,248,884 B2
(45) Date of Patent: Feb. 2, 2016

(54) CHILDREN'S TRICYCLE

(71) Applicant: Ming-He Shih, Tainan (TW)

(72) Inventor: Ming-He Shih, Tainan (TW)

( * ) Notice: Subject to any disclaimer, the term of this patent is extended or adjusted under 35 U.S.C. 154(b) by 136 days.

(21) Appl. No.: 14/283,406

(22) Filed: May 21, 2014

(65) Prior Publication Data

US 2015/0336630 A1 Nov. 26, 2015

(51) Int. Cl.
*B62M 1/38* (2013.01)
*B62M 3/08* (2006.01)
*B62K 9/02* (2006.01)

(52) U.S. Cl.
CPC .. *B62M 1/38* (2013.01); *B62K 9/02* (2013.01); *B62M 3/08* (2013.01)

(58) Field of Classification Search
CPC .......... B62M 1/38; B62M 3/003; B62M 3/08; B62K 5/02; B62K 9/02
USPC ........... 280/259, 260, 282; 301/2.5; 74/594.1, 74/594.7
See application file for complete search history.

(56) References Cited

U.S. PATENT DOCUMENTS

| | | | | |
|---|---|---|---|---|
| 312,277 | A * | 2/1885 | Latta ...................... | B62K 19/34 301/2.5 |
| 324,264 | A * | 8/1885 | Latta ....................... | B62L 3/00 280/264 |
| 590,695 | A * | 9/1897 | Alcorn .................... | B62M 3/00 403/305 |
| 1,373,707 | A * | 4/1921 | Bennett .................. | B62K 19/34 301/2.5 |
| 1,541,490 | A * | 6/1925 | Ferris .................... | B62K 19/34 301/110.5 |
| 2,994,559 | A * | 8/1961 | Carlson .................. | B60B 37/10 301/2.5 |
| 4,358,967 | A * | 11/1982 | Kastan ................... | B62K 19/34 74/594.1 |
| 4,966,419 | A * | 10/1990 | Cunard .................. | B60B 27/023 301/110.5 |
| 2009/0261553 | A1 * | 10/2009 | Meggiolan ............. | B62M 3/003 280/259 |
| 2011/0011201 | A1 * | 1/2011 | Kao ........................ | B62M 3/00 74/594.1 |

* cited by examiner

*Primary Examiner* — Anne Marie Boehler
(74) *Attorney, Agent, or Firm* — Rosenberg, Klein & Lee

(57) ABSTRACT

A children's tricycle comprises a body, a front wheel pivotally assembled to the body, a first pedaling assembly assembled to the front wheel, a second pedaling assembly assembled to the front wheel, a screw for making the first pedaling assembly threaded with the second pedaling assembly. A first inserting rod of the first pedaling assembly and a second inserting rod of the second pedaling assembly are connected to the front wheel separately, such that the first and second pedaling assemblies can be assembled to or detached from the front wheel quickly. The first and second pedaling assemblies can be assembled to the tricycle for the child to step on, and can also be detached from the tricycle when the child is learning to walk, such a tricycle is not only money-saving since the parents don't need to buy a special baby walker additionally, but also has high convenience and security.

5 Claims, 7 Drawing Sheets

CHILDREN'S TRICYCLE

BACKGROUND OF THE INVENTION

1. Field of the Invention

The present invention relates to a children's tricycle, and more particularly to a detachable children's tricycle that is applicable to ride or walk and has high security and convenience.

2. Description of the Prior Art

A conventional children's tricycle generally comprises a tricycle front, two handlebars assembled to the tricycle front, two pedals, a front wheel, two rear wheels and a seat. When in use, the steering of the tricycle in motion is done by a child who is seated on the tricycle, with both hands holding the handlebars. However, since the pedals are undetachable, when the child is learning to walk, the pedals will block the child's feet forward, or even cause feet hurt, and it is money-consuming since the parents have to buy a special baby walker.

The present invention has arisen to mitigate and/or obviate the afore-described disadvantages.

SUMMARY OF THE INVENTION

The primary objective of the present invention is to provide a children's tricycle comprises a body, a front wheel, a first pedaling assembly, a second pedaling assembly, a first cover, a second cover and a screw.

The body is provided with a first connecting pipe and a second connecting pipe.

The front wheel is provided with a wheel body, a middle rod protruded out of two lateral ends of the wheel body and pivotally mounted in the first and second connecting pipes, a first connecting rod protruded out of one lateral end of the middle rod, a second connecting rod protruded out of the other lateral end of the middle rod, a through hole penetrating the first connecting rod, the middle rod and the second connecting rod, a first notch defined in the first connecting rod and in communication with the through hole, and a second notch defined in the second connecting rod and in communication with the through hole.

The first pedaling assembly includes a first inserting rod inserted in one lateral end of the through hole, a first rod protruded out of the first inserting rod and abutted against the first notch, a first pedal pivoted to the first rod, and a threaded groove defined in one lateral end of the first inserting rod.

The second pedaling assembly includes a second inserting rod inserted in the other lateral end of the through hole, a second rod protruded out of the second inserting rod and abutted against the second notch, a second pedal pivoted to the second rod, and a penetrating hole penetrating the second inserting rod.

The screw is threaded with the threaded groove via the penetrating hole, so as to make the first inserting rod fixed to the second inserting rod.

The first connecting rod is defined with a groove in communication with the through hole. The first pedaling assembly is further provided with a positioning rod protruded out of the first inserting rod and stopped by the groove.

The first pedaling assembly further includes a locking groove defined in one end of the first inserting rod. The second pedaling assembly further includes a locking block disposed at one end of the second inserting rod and engaged with the locking groove.

The first cover covers the first connecting rod, and the second cover covers the second connecting rod.

In an outer periphery of the first connecting rod is defined a first positioning groove, in an outer periphery of the second connecting rod is defined a second positioning groove. The first cover includes a first annular periphery, a first notch section mounted on the first rod, and a first positioning block protruded out of an internal surface of the first annular periphery and engaged in the first positioning groove. The second cover includes a second annular periphery, a second notch section mounted on the second rod, and a second positioning block protruded out of an internal surface of the second annular periphery and engaged in the second positioning groove.

The first and second pedaling assemblies can be assembled to the tricycle for the child to step on, and can also be detached from the tricycle when the child is learning to walk, such a tricycle is not only money-saving since the parents don't need to buy a special baby walker additionally, but also has high convenience and security.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
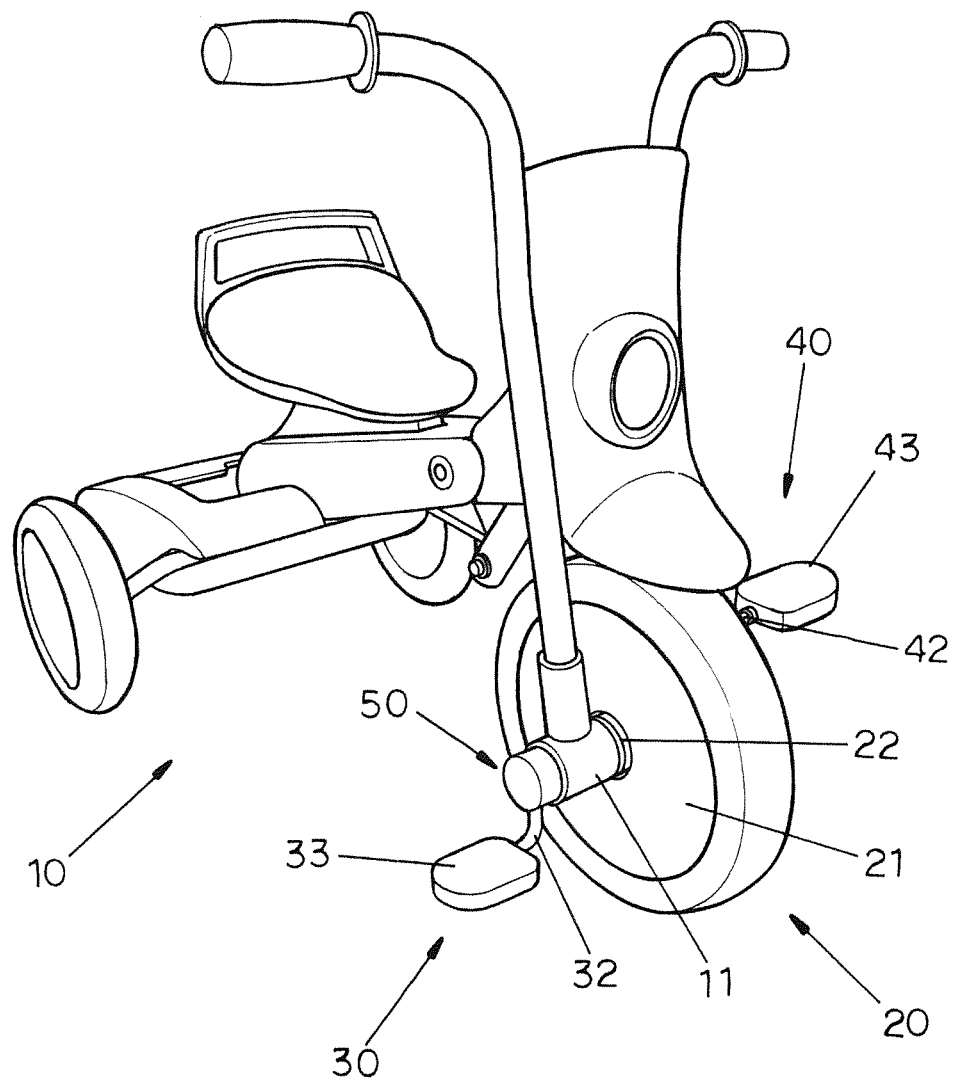
FIG. 1 is a perspective view of a children's tricycle in accordance with the present invention.
Figure 2:
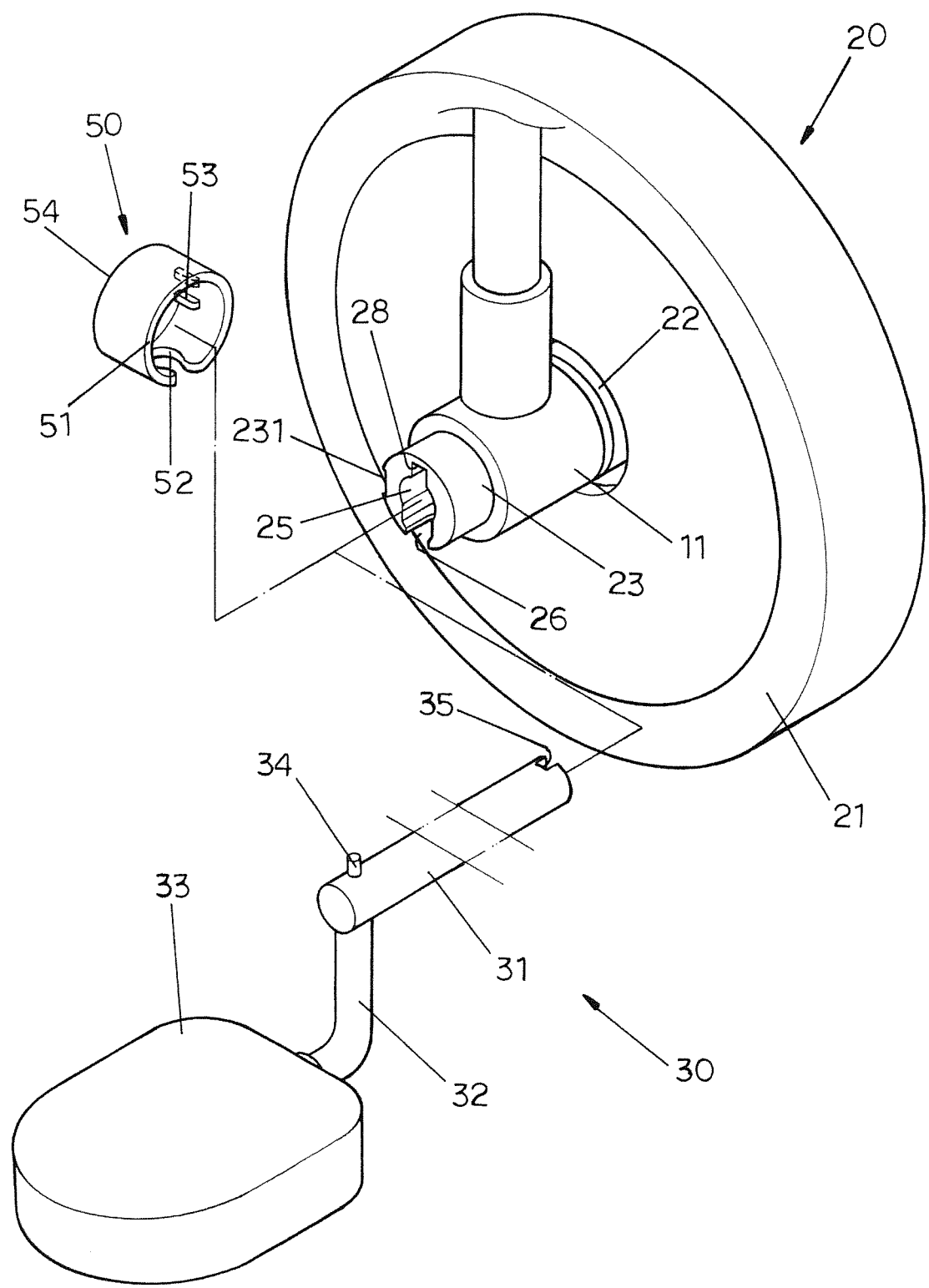
FIG. 2 is a partial exploded view of showing the related positions of a front wheel, a first pedaling assembly and a first cover.
Figure 3:
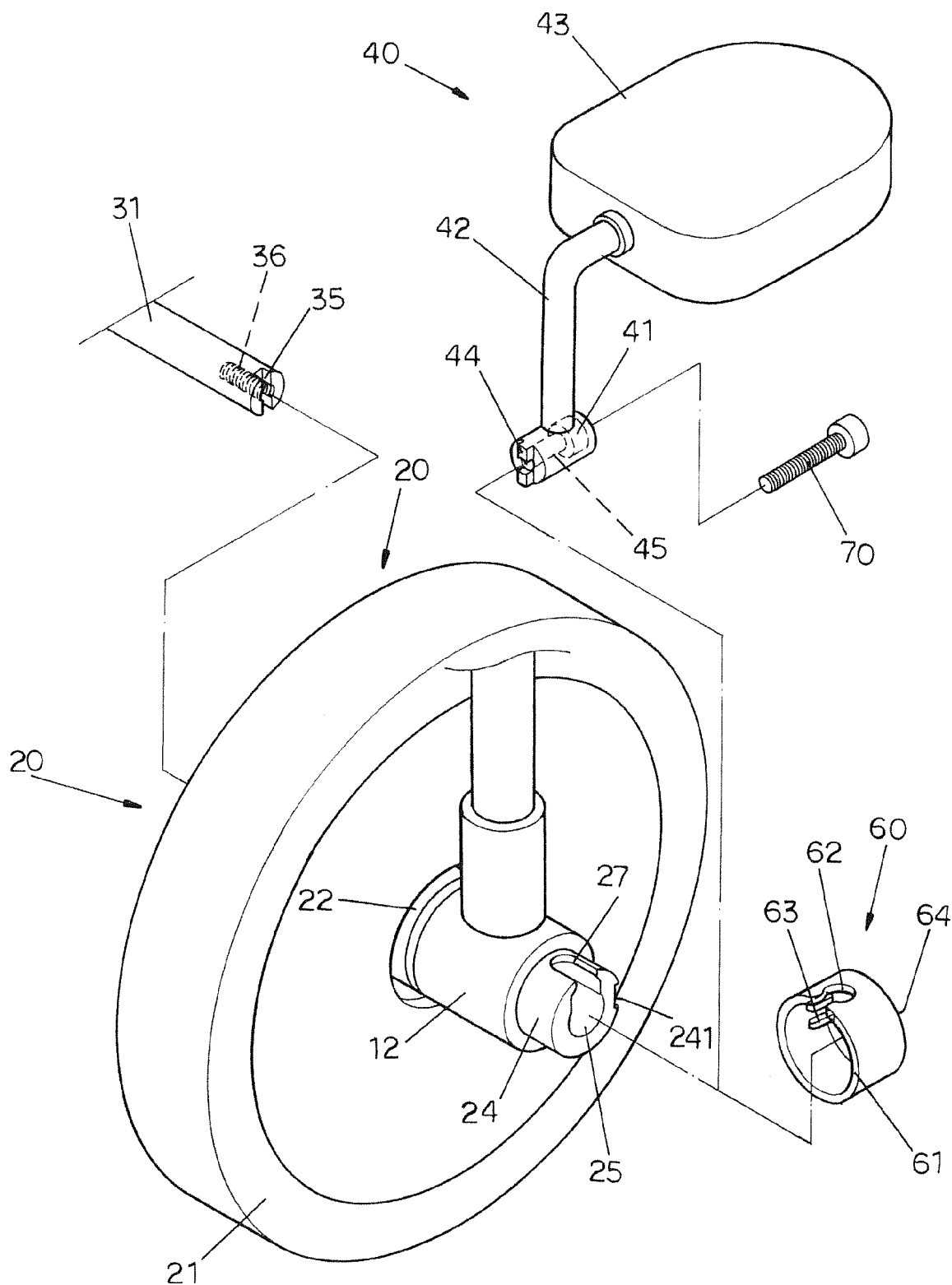
FIG. 3 is another partial exploded view of showing the related positions of the front wheel, a second pedaling assembly, a second cover and a screw.

Referring to FIGS. 1-3, a children's tricycle in accordance with the present invention comprises a body 10, a front wheel 20 pivotally assembled to the body 10, a first pedaling assembly 30, a second pedaling assembly 40, a first cover 50, a second cover 60 and a screw 70.

The body 10 is provided with a first connecting pipe 11 and a second connecting pipe 12.

The front wheel 20 is provided with a wheel body 21, a middle rod 22 protruded out of two lateral ends of the wheel body 21 and pivotally mounted in the first and second connecting pipes 11, 12, a first connecting rod 23 protruded out of one lateral end of the middle rod 22, a second connecting rod 24 protruded out of the other lateral end of the middle rod 22, a through hole 25 penetrating the first connecting rod 23, the middle rod 22 and the second connecting rod 24, a first notch 26 defined in the first connecting rod 23 and in communication with the through hole 25, a second notch 27 defined in the second connecting rod 24 and in communication with the through hole 25, and a groove 28 defined in the first connecting rod 23 and in communication with the through hole 25. In an outer periphery of the first connecting rod 23 is defined a first positioning groove 231, and in an outer periphery of the second connecting rod 24 is defined a second positioning groove 241.

The first pedaling assembly 30 is provided with a first inserting rod 31, a first rod 32 protruded out of the first inserting rod 31, a first pedal 33 pivoted to the first rod 32, a positioning rod 34 protruded out of the first inserting rod 31, a locking groove 35 defined in one end of the first inserting rod 31, and a threaded groove 36 defined in one lateral end of the first inserting rod 31 and in communication with the locking groove 35.

The second pedaling assembly 40 is provided with a second inserting rod 41, a second rod 42 protruded out of the second inserting rod 41, a second pedal 43 pivoted to the second rod 42, a locking block 44 disposed at one end of the second inserting rod 41, and a penetrating hole 45 penetrating the second inserting rod 41.

The first cover 50 includes a first annular periphery 51, a first notch section 52 defined in the first annular periphery 51, a first positioning block 53 protruded out of an internal surface of the first annular periphery 51, and a first lateral wall 54 connected to one lateral end of the first annular periphery 51.

The second cover 60 includes a second annular periphery 61, a second notch section 62 defined in the second annular periphery 61, a second positioning block 63 protruded out of an internal surface of the second annular periphery 61, and a second lateral wall 64 connected to one lateral end of the second annular periphery 61.

Figure 4:
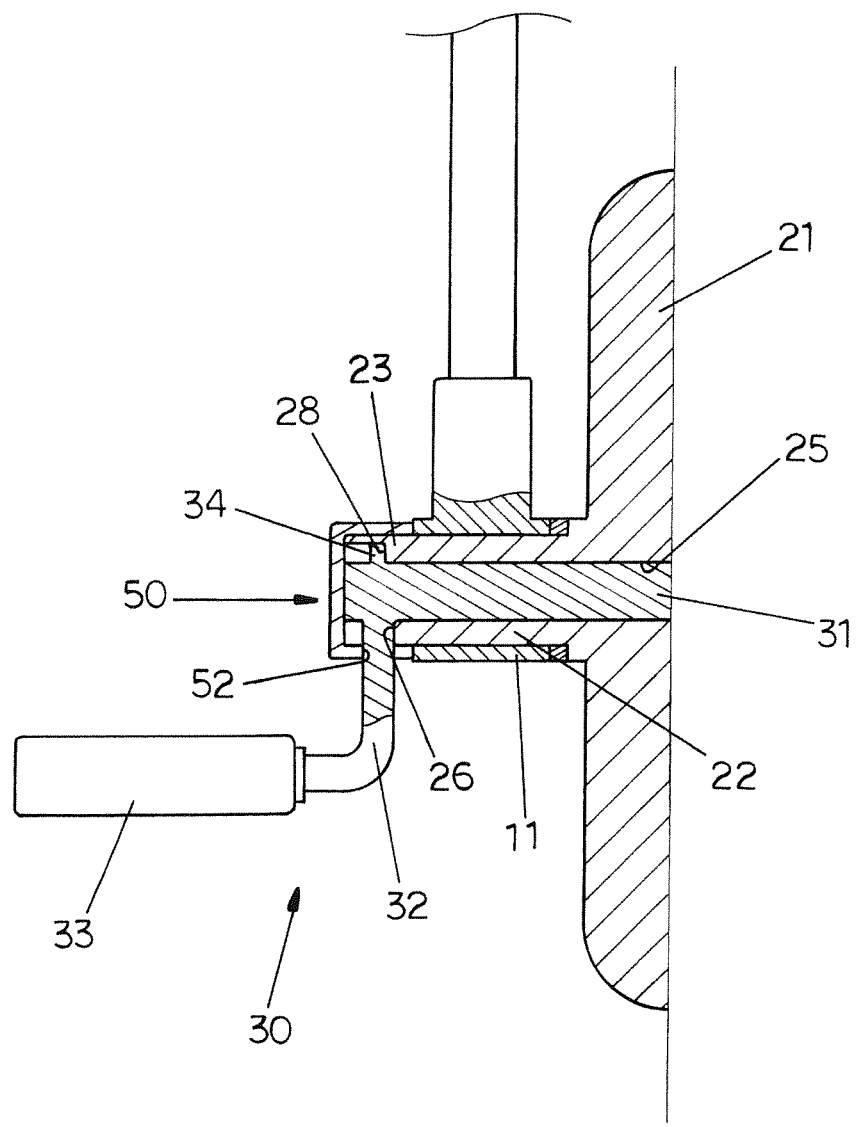
FIG. 4 is an assembly cross sectional view of FIG. 2.
Figure 5:
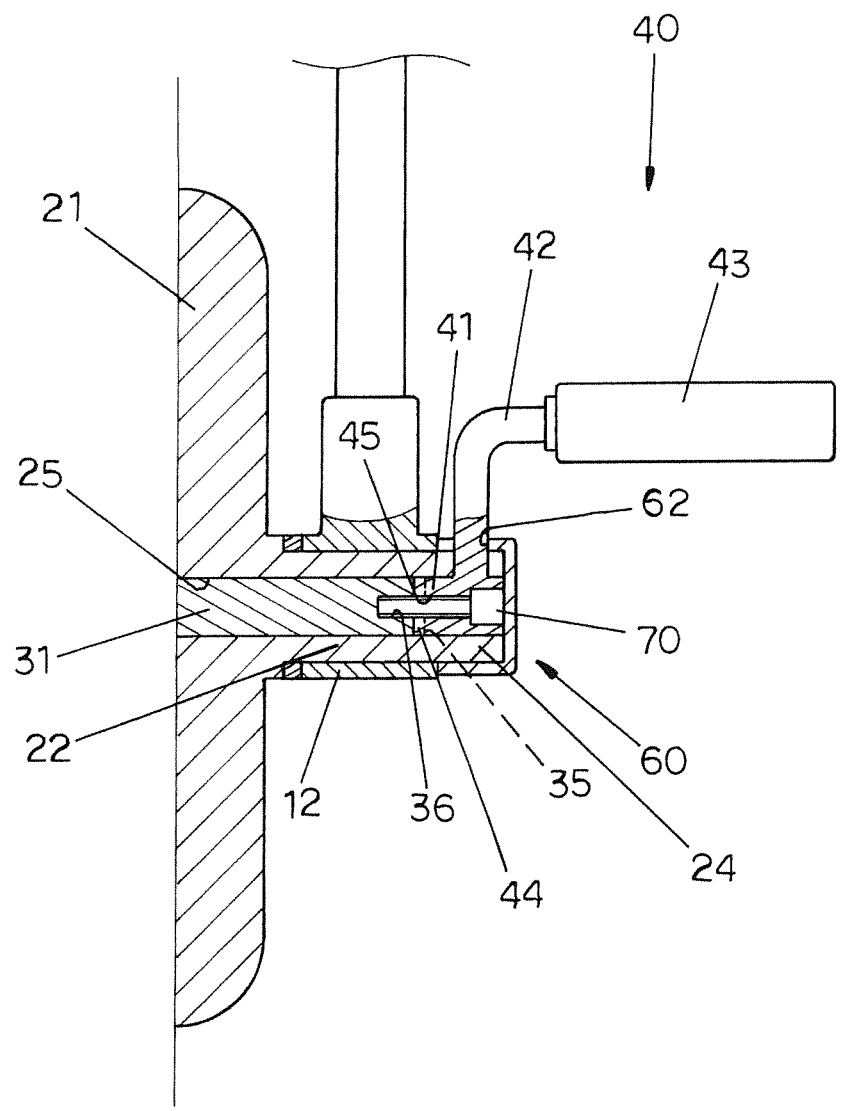
FIG. 5 is an assembly cross sectional view of FIG. 3.

Referring to FIGS. 4 and 5, when assembling, the first inserting rod 31 of the first pedaling assembly 30 is inserted in one lateral end of the through hole 25 to make the first rod 32 abutted against the first notch 26 and the positioning rod 34 stopped by the groove 28, the second inserting rod 41 of the second pedaling assembly 40 is inserted in the other lateral end of the through hole 25 to make the locking block 44 engaged in the locking groove 35 and the second rod 42 abutted against the second notch 27, and the screw 70 is threaded with the threaded groove 36 via the penetrating hole 45, such that the first inserting rod 31 is fixed to the second inserting rod 41. And then the first cover 51 covers the first connecting rod 23, the second cover 60 covers the second connecting rod 24, the first notch section 52 is mounted on the first rod 32, the second notch section 62 is mounted on the second rod 42, the first positioning block 53 is engaged in the first positioning groove 231, and the second positioning block 63 is engaged in the second positioning groove 241, which can prevent the first cover 50 from separating from the first connecting rod 23, and the second cover 60 from separating from the second connecting rod 24. Thereby, when the child stepping on the first and second pedals 33, 43 by his/her feet to move the first and second connecting rods 23, 24, the first wheel 20 will move forward, so as to achieve the object of riding the tricycle.

Figure 6:
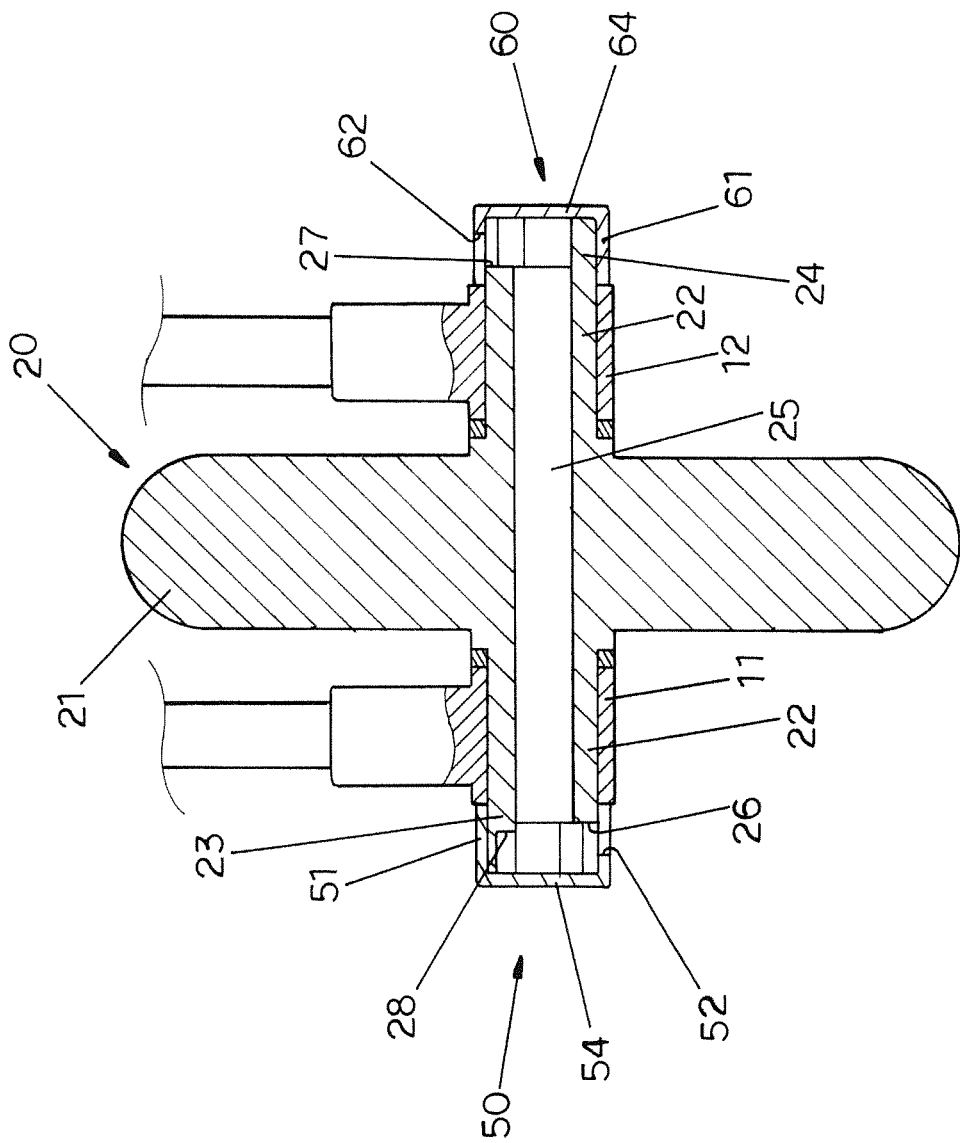
FIG. 6 is a partial assembly cross sectional view of the children's tricycle when the first and second pedaling assemblies are detached.
Figure 7:
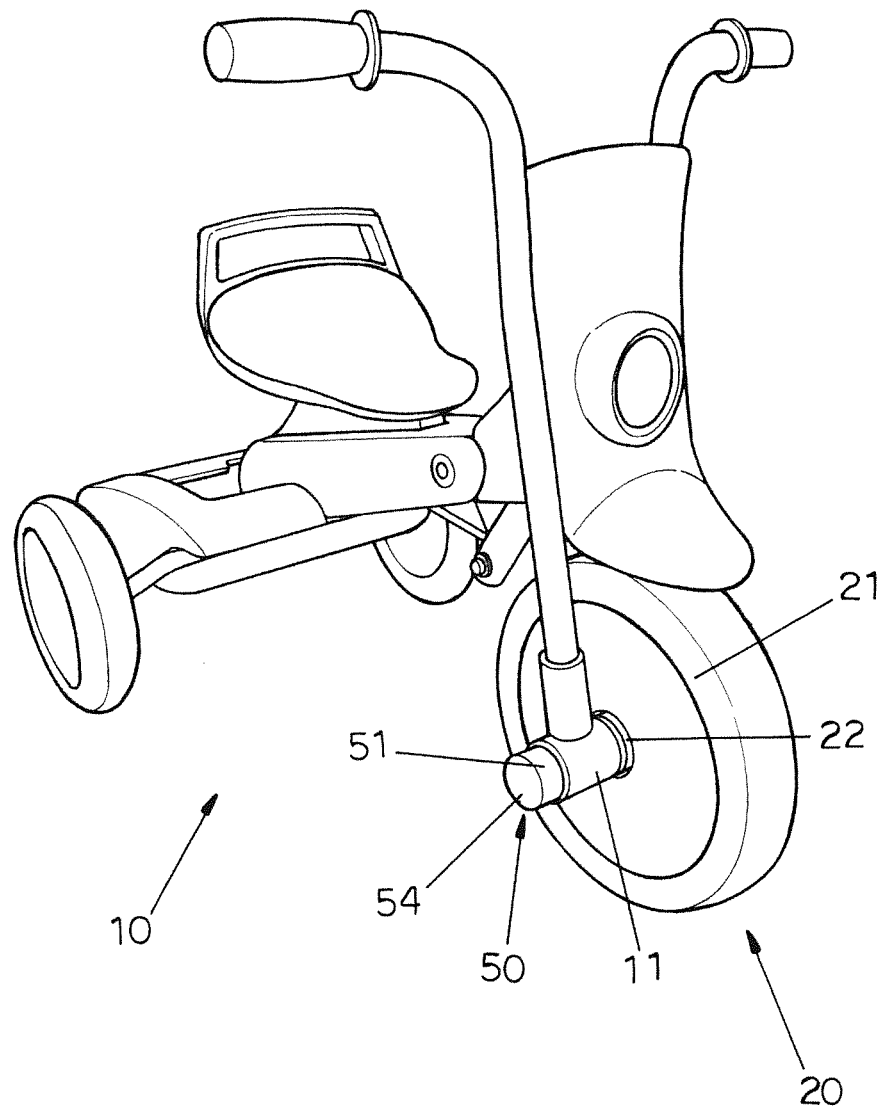
FIG. 7 is another perspective view of the children's tricycle in accordance with the present invention.

Referring to FIGS. 6 and 7, when disassembling, the first cover 50 is detached from the first connecting rod 23, the second cover 60 is detached from the second connecting rod 24, the screw 70 is disengaged with the threaded groove 36, the second inserting rod 41 of the second pedaling assembly 40 is separated from the through hole 25 to make the locking block 44 disengaged with the locking groove 35 and the second rod 42 separated from the second notch 27, so as to separate the second pedaling assembly 40 from the second connecting rod 24. And then the first inserting rod 31 of the first pedaling assembly 30 is separated from through hole 25 to make the first rod 32 separated from the first notch 26 and the positioning rod 34 released from the groove 28, so as to separate the first pedaling assembly 30 from the first connect-ing rod 23. Finally, the first cover 50 covers the first connecting rod 23, the second cover 60 covers the second connecting rod 24. Thereby, when learning to walk, the child's feet will not be blocked by the first and second pedals 33, 43, which can avoid the child's feet hurt, improving the using convenience and security.

It is apparent from the above-mentioned descriptions that the present invention has the advantages described as follows:

The first and second pedaling assemblies 30, 40 can be assembled to the tricycle for the child to step on, and can also be detached from the tricycle when the child is learning to walk so as to prevent the child's feet from being blocked by the first and second pedals 33, 43, such a tricycle is not only money-saving since the parents don't need to buy a special baby walker additionally, but also has high convenience and security.

While we have shown and described various embodiments in accordance with the present invention, it should be clear to those skilled in the art that further embodiments may be made without departing from the scope of the present invention.

What is claimed is:

1. A children's tricycle comprising:
    a body being provided with a first connecting pipe and a second connecting pipe;
    a front wheel providing with a wheel body, a middle rod being protruded out of two lateral ends of the wheel body and pivotally mounted in the first and second connecting pipes, a first connecting rod being protruded out of one lateral end of the middle rod, a second connecting rod being protruded out of the other lateral end of the middle rod, a through hole penetrating the first connecting rod, the middle rod and the second connecting rod, a first notch being defined in the first connecting rod and in communication with the through hole, a second notch being defined in the second connecting rod and in communication with the through hole;
    a first pedaling assembly including a first inserting rod being inserted in one lateral end of the through hole, a first rod being protruded out of the first inserting rod and abutted against the first notch, a first pedal being pivoted to the first rod, a threaded groove being defined in one lateral end of the first inserting rod;
    a second pedaling assembly including a second inserting rod being inserted in the other lateral end of the through hole, a second rod being protruded out of the second inserting rod and abutted against the second notch, a second pedal being pivoted to the second rod, a penetrating hole penetrating the second inserting rod; and
    a screw being threaded with the threaded groove via the penetrating hole, so as to make the first inserting rod fixed to the second inserting rod.

2. The children's tricycle as claimed in claim 1, wherein the first connecting rod is defined with a groove in communication with the through hole, the first pedaling assembly is further provided with a positioning rod protruded out of the first inserting rod and stopped by the groove.

3. The children's tricycle as claimed in claim 2, wherein the first pedaling assembly further includes a locking groove defined in one end of the first inserting rod, the second pedaling assembly further includes a locking block disposed at one end of the second inserting rod and engaged with the locking groove.

4. The children's tricycle as claimed in claim 3 further comprising a first cover covers the first connecting rod, and a second cover covers the second connecting rod.

5. The children's tricycle as claimed in claim 4, wherein in an outer periphery of the first connecting rod is defined a first positioning groove, in an outer periphery of the second connecting rod is defined a second positioning groove, the first cover includes a first annular periphery, a first notch section mounted on the first rod, and a first positioning block protruded out of an internal surface of the first annular periphery and engaged in the first positioning groove, the second cover includes a second annular periphery, a second notch section mounted on the second rod, and a second positioning block protruded out of an internal surface of the second annular periphery and engaged in the second positioning groove.

* * * * *